United States Patent
Ye et al.

(10) Patent No.: US 12,158,651 B2
(45) Date of Patent: Dec. 3, 2024

(54) DISPLAY PANEL AND DISPLAY DEVICE

(71) Applicant: WUHAN CHINA STAR OPTOELECTRONICS TECHNOLOGY CO., LTD., Wuhan (CN)

(72) Inventors: Wenlong Ye, Wuhan (CN); Wei Cheng, Wuhan (CN); Rui He, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 18/011,076

(22) PCT Filed: Dec. 15, 2021

(86) PCT No.: PCT/CN2021/138476
§ 371 (c)(1),
(2) Date: Dec. 16, 2022

(87) PCT Pub. No.: WO2023/102982
PCT Pub. Date: Jun. 15, 2023

(65) Prior Publication Data
US 2024/0248342 A1    Jul. 25, 2024

(30) Foreign Application Priority Data
Dec. 9, 2021 (CN) .......................... 202123086434.2

(51) Int. Cl.
*G02F 1/1334* (2006.01)
*G02F 1/13* (2006.01)
(Continued)

(52) U.S. Cl.
CPC ........ *G02F 1/13345* (2021.01); *G02F 1/1323* (2013.01); *G02F 1/133531* (2021.01); *G02F 1/13476* (2013.01)

(58) Field of Classification Search
CPC ............... G02F 1/13345; G02F 1/1323; G02F 1/133531; G02F 1/13476
See application file for complete search history.

(56) References Cited

U.S. PATENT DOCUMENTS

2006/0061707 A1   3/2006  Yano
2021/0349335 A1*  11/2021 Chen ..................... G02F 1/1323

FOREIGN PATENT DOCUMENTS

CN    111427203 A    7/2020
CN    111929943 A    11/2020
(Continued)

OTHER PUBLICATIONS

Written Opinion of the International Search Authority in International application No. PCT/CN2021/138476, mailed on Jul. 29, 2022.

*Primary Examiner* — James A Dudek
(74) *Attorney, Agent, or Firm* — PV IP PC; Wei Te Chung

(57) ABSTRACT

The present application embodiment discloses a display panel and a display device. The display panel includes a first mode and a second mode. The viewing angle of the display panel in the first mode is smaller than the viewing angle of the display panel in the second mode; the dimming liquid crystal cell is overlapped with the viewing angle adjustment liquid crystal cell; in the second mode, the dimming liquid crystal cell is used to scatter the incoming light; the panel body is arranged on a light-emitting side of the viewing angle adjustment liquid crystal cell and the dimming liquid crystal cell.

18 Claims, 6 Drawing Sheets

(51) Int. Cl.
*G02F 1/1335* (2006.01)
*G02F 1/1347* (2006.01)

(56) References Cited

FOREIGN PATENT DOCUMENTS

| | | |
|---|---|---|
| CN | 112711152 A | 4/2021 |
| CN | 113552741 A | 10/2021 |
| CN | 113625373 A | 11/2021 |

* cited by examiner

DISPLAY PANEL AND DISPLAY DEVICE

CROSS-REFERENCE TO RELATED APPLICATION

This patent application claims priority to International Patent Application No. PCT/CN2021/138476, filed on Dec. 15, 2021, which claims the benefit and priority of Chinese Patent Application No. 202123086434.2, filed with the China National Intellectual Property Administration on Dec. 9, 2021, the disclosures of which are incorporated by reference herein in its entirety as part of the present application.

TECHNICAL FIELD

The present disclosure relates to a field of display technology, and particularly, to a display panel and a display device.

BACKGROUND OF INVENTION

With the popularity of display devices and people's increasing emphasis on personal privacy, display devices with peep-proof function are more favored by consumers. The traditional peep-proof function is mostly realized by adding a layer of privacy film on the surface of the display device. However, this method cannot switch between a peep-proof and a non-peep-proof mode, thus cannot meet the needs of consumers on different occasions.

In the process of research and practice of existing technologies, the inventor of the present application found that in order to satisfy consumers for switching between the peep-proof mode and the non-peep-proof mode, it is usually realized by setting a liquid crystal dimming box under the display panel. However, with the additional setting of the liquid crystal dimming box, the brightness of the side viewing angle is relatively low in a wide viewing angle (the non-peep-proof mode). That is, the display effect of the display device under the wide viewing angle is not good.

SUMMARY OF INVENTION

The embodiment of the present application provides a display panel and a display device, which can improve the display effect of the display panel under the wide viewing angle.

The embodiment of the present application provides a display panel, wherein the display panel includes a first mode and a second mode, a viewing angle of the display panel in the first mode is smaller than a viewing angle of the display panel in the second mode, and the display panel further includes:
  a viewing angle adjustment liquid crystal cell, wherein the viewing angle adjustment liquid crystal cell is configured to adjust a display viewing angle of the display panel, and the viewing angle adjustment liquid crystal cell includes a first liquid crystal layer including a polymer network and first liquid crystal molecules distributed in the polymer network;
  a dimming liquid crystal cell, wherein the dimming liquid crystal cell and the viewing angle adjustment liquid crystal cell are overlapped, the dimming liquid crystal cell includes a second liquid crystal layer including a polymer and second liquid crystal molecules distributed in the polymer, and the dimming liquid crystal cell is configured to scatter incident light in the second mode; and
  a panel body, wherein the panel body is arranged on a light-emitting side of the viewing angle adjustment liquid crystal cell and the dimming liquid crystal cell.

In an embodiment, in some embodiments of the present application, the display panel further includes a first polarizer and a second polarizer, an optical axis direction of the first polarizer is parallel to an optical axis direction of the second polarizer, the first polarizer is arranged on the viewing angle adjustment liquid crystal cell, and the second polarizer is arranged on one side of the viewing angle adjustment liquid crystal cell away from the first polarizer;
  the second liquid crystal molecules have a first refractive index and a second refractive index, the first refractive index is a refractive index of the second liquid crystal molecule in a long axis direction, the second refractive index is a refractive index of the second liquid crystal molecule in a short axis direction, the first refractive index is greater than the second refractive index, and a refractive index of the polymer is equal to the second refractive index; and
  the long axis direction of the second liquid crystal molecule is crossed with a normal direction of the first polarizer in the second mode.

In an embodiment, in some embodiments of the present application, the long axis direction of the second liquid crystal molecule is parallel to the normal direction of the first polarizer in the first mode.

In an embodiment, in some embodiments of the present application, the long axis direction of the second liquid crystal molecule is perpendicular to the normal direction of the first polarizer in the second mode.

In an embodiment, in some embodiments of the present application, a difference between the first refractive index and the second refractive index is greater than or equal to 0.07 and less than or equal to 0.5.

In an embodiment, in the dimming liquid crystal cell of some embodiments of the present application, the polymer is a polymer network, the second liquid crystal molecules are negative liquid crystals, the polymer is arranged along a first direction, and the first direction is parallel to the normal direction of the first polarizer.

In an embodiment, in some embodiments of the present application, in the dimming liquid crystal cell of some embodiments of the present application, a porous structure is formed inside the polymer, the second liquid crystal molecules are dispersed in the porous structure, and the second liquid crystal molecules are positive liquid crystals.

In an embodiment, in some embodiments of the present application, the dimming liquid crystal cell further includes a first electrode layer and a second electrode layer, the first electrode layer is arranged on a side of the second liquid crystal layer close to the panel body, and the second electrode layer is arranged on a side of the second liquid crystal layer away from the first electrode layer.

In an embodiment, in some embodiments of the present application, the viewing angle adjustment liquid crystal cell further includes a third electrode layer and a fourth electrode layer, the third electrode layer is arranged between the first polarizer and the first liquid crystal layer, and the fourth electrode layer is arranged between the second polarizer and the first liquid crystal layer;
  the polymer network is arranged along a second direction, the second direction is inclined with respect to the normal direction of the first polarizer;

in the first mode, a long axis of the first liquid crystal molecule is arranged along the second direction; and in the second mode, the long axis of the first liquid crystal molecule is arranged along the third direction, and the second direction is different from the third direction.

In an embodiment, in some embodiments of the present application, the display panel further includes a third polarizer, the third polarizer is arranged on a light-emitting side of the panel body, and an optical axis direction of the third polarizer is perpendicular to the optical axis direction of the first polarizer.

In an embodiment, in the second mode of some embodiments of the present application, a luminance percentage corresponding to a 45 degree viewing angle in a brightness curve of the second liquid crystal layer is greater than 15%.

Correspondingly, the embodiment of the present application further provides a display device including a backlight module and the aforementioned display panel arranged on the backlight module.

As an example, the display panel includes a first mode and a second mode, a viewing angle of the display panel in the first mode is smaller than a viewing angle of the display panel in the second mode, and the display panel includes:

a viewing angle adjustment liquid crystal cell, wherein the viewing angle adjustment liquid crystal cell is configured to adjust a display viewing angle of the display panel, the viewing angle adjustment liquid crystal cell includes a first liquid crystal layer, and the first liquid crystal layer includes a polymer network and first liquid crystal molecules distributed in the polymer network;

a dimming liquid crystal cell, wherein the dimming liquid crystal cell and the viewing angle adjustment liquid crystal cell are overlapped, the dimming liquid crystal cell includes a second liquid crystal layer, the second liquid crystal layer includes a polymer and second liquid crystal molecules distributed in the polymer, and the dimming liquid crystal cell is configured to scatter the incident light in the second mode; and a panel body, wherein the panel body is arranged on a light-emitting side of the viewing angle adjustment liquid crystal cell and the dimming liquid crystal cell.

In an embodiment, in some embodiments of the present application, the display panel further includes a first polarizer and a second polarizer, an optical axis direction of the first polarizer is parallel to an optical axis direction of the second polarizer, the first polarizer is arranged on the viewing angle adjustment liquid crystal cell, and the second polarizer is arranged on a side of the viewing angle adjustment liquid crystal cell away from the first polarizer;

the second liquid crystal molecules have a first refractive index and a second refractive index, the first refractive index is a refractive index of the second liquid crystal molecule in a long axis direction, the second refractive index is a refractive index of the second liquid crystal molecule in a short axis direction, the first refractive index is greater than the second refractive index, and a refractive index of the polymer is equal to the second refractive index; and in the second mode, the long axis direction of the second liquid crystal molecule is crossed with a normal direction of the first polarizer.

In an embodiment, in the first mode of some embodiments of the present application, the long axis direction of the second liquid crystal molecule is parallel to the normal direction of the first polarizer.

In an embodiment, in the second mode of some embodiments of the present application, the long axis direction of the second liquid crystal molecule is perpendicular to the normal direction of the first polarizer.

In an embodiment, in some embodiments of the present application, a difference between the first refractive index and the second refractive index is greater than or equal to 0.07 and less than or equal to 0.5.

Optional, in the dimming liquid crystal cell of some embodiments of the present application, the polymer is a polymer network, the second liquid crystal molecules are negative liquid crystals, the polymer is arranged along a first direction, and the first direction is parallel to the normal direction of the first polarizer.

In an embodiment, in the dimming liquid crystal cell of some embodiments of the present application, a porous structure is formed inside the polymer, the second liquid crystal molecules are dispersed in the porous structure, and the second liquid crystal molecules are positive liquid crystals.

In an embodiment, in some embodiments of the present application, the dimming liquid crystal cell further includes a first electrode layer and a second electrode layer, the first electrode layer is arranged on a side of the second liquid crystal layer close to the panel body, and the second electrode layer is arranged on a side of the second liquid crystal layer away from the first electrode layer.

In an embodiment, in some embodiments of the present application, the viewing angle adjustment liquid crystal cell further includes a third electrode layer and a fourth electrode layer, the third electrode layer is arranged between the first polarizer and the first liquid crystal layer, and the fourth electrode layer is arranged between the second polarizer and the first liquid crystal layer;

the polymer network is arranged along a second direction, and the second direction is inclined with respect to the normal direction of the first polarizer;

in the first mode, a long axis of the first liquid crystal molecule is arranged along the second direction; and in the second mode, the long axis of the first liquid crystal molecule is arranged along the third direction, and the second direction is different from the third direction.

The display panel of the embodiment of the present application includes the first mode and the second mode. The viewing angle of the display panel in the first mode is smaller than the viewing angle of the display panel in the second mode. The viewing angle adjustment liquid crystal cell is configured to adjust the display viewing angle of the display panel. In the second mode, the display panel uses the dimming liquid crystal cell to scatter the incident light to improve the side-view brightness under wide viewing angles, thus the display effect of the wide viewing angle is improved.

BRIEF DESCRIPTION OF THE DRAWINGS

In order to more clearly illustrate the technical solution in the embodiment of the present application, the following will briefly introduce the drawings used in the description of the embodiment. Obviously, the drawings in the following description are only some embodiments of the present application. For those skilled in the art, without creative work, other drawings can also be obtained from these drawings.

DESCRIPTION OF PREFERRED EMBODIMENTS

Figure 1:
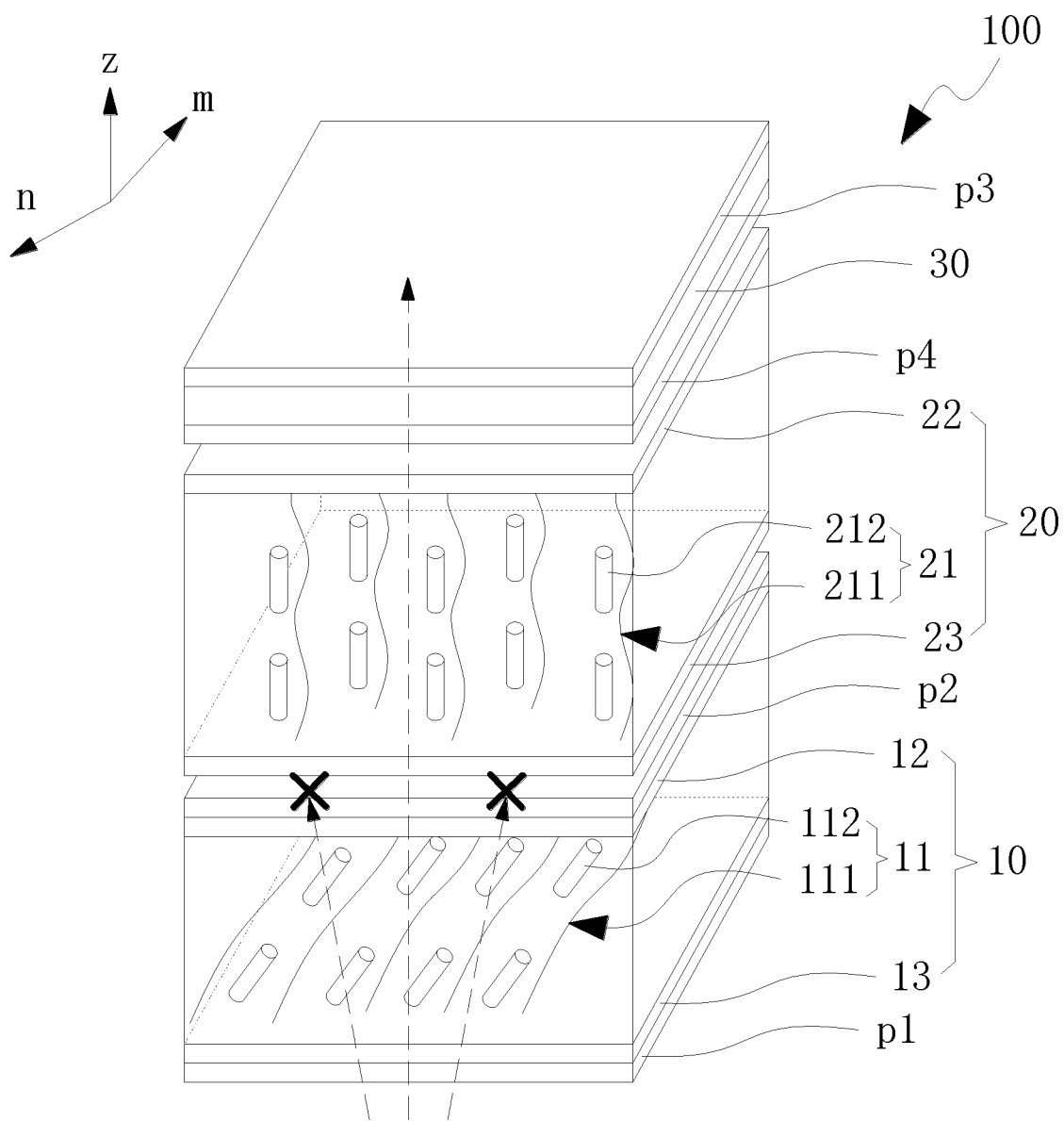
FIG. 1 is a schematic diagram of a first structure of a display panel in a first mode provided by an embodiment of the present application.

Combined with the drawings in the embodiment of the present application, the technical scheme in the embodiment of the present application is clearly and completely described in the following. Obviously, the described embodiments are only a part of the embodiments of the present application, not all of the embodiments. Based on the embodiment in the present application, all the other embodiments obtained by those skilled in the art without creative work also belong to the scope of protection of the present application. In addition, it should be understood that the specific implementations described here are only used to illustrate and explain the present application, not used to limit the present application. In the present application, unless otherwise stated, the terminology used such as "upper" and "lower" usually refers to the upper and lower positions of the device in actual use or working state, specifically, refers to the direction of the drawing in the attached drawing; and the "inner" and "outer" refer to the outline of the device.

The embodiment of the present application provides a display panel and a display device, and detailed descriptions are given below. It should be noted that the following description order of embodiments is not to be taken as a limitation on the preferred order of embodiments.

Figure 2:
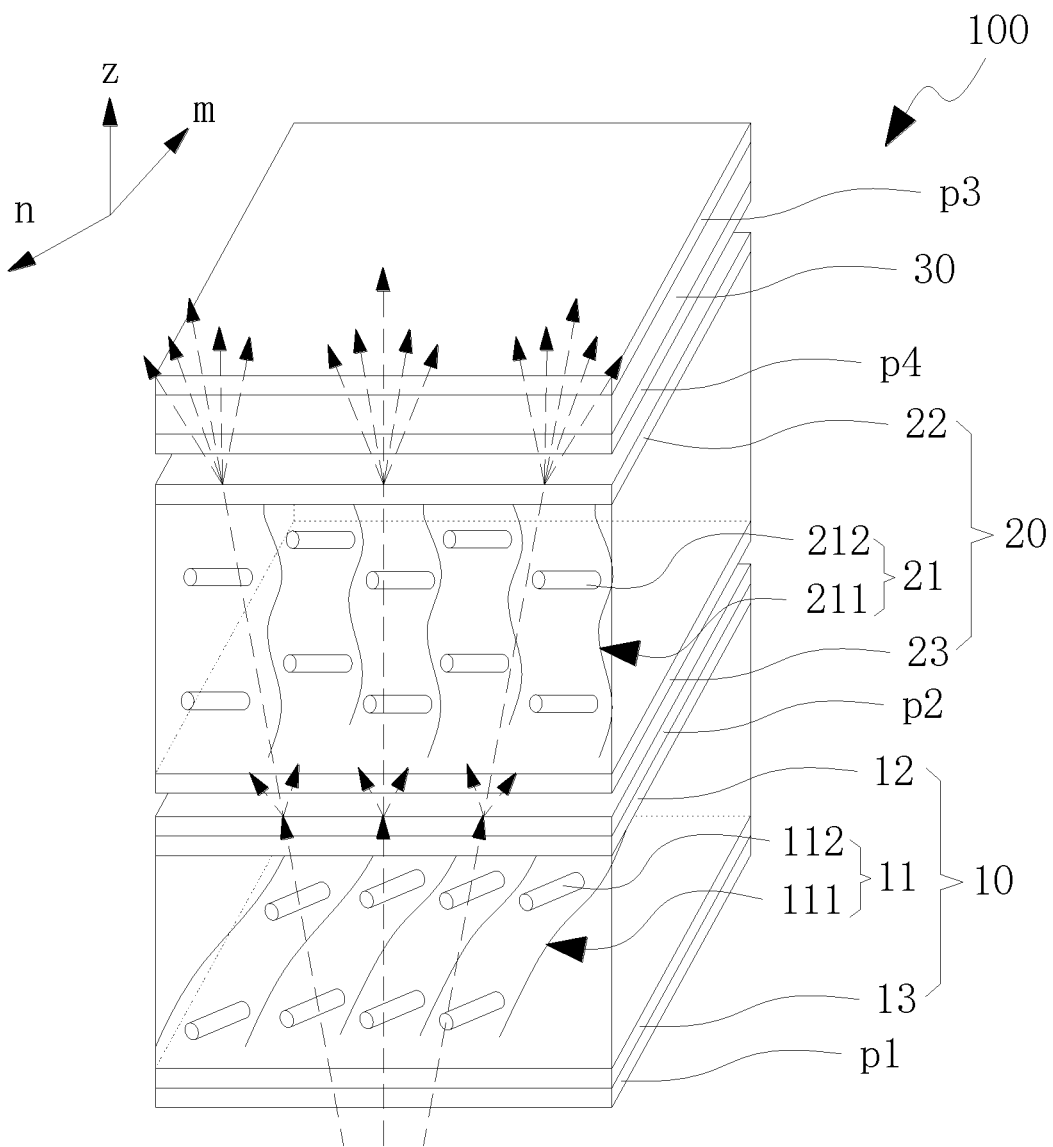
FIG. 2 is a schematic diagram of a first structure of a display panel in a second mode provided by an embodiment of the present application.

Please refer to FIG. 1 and FIG. 2. An embodiment of the present application provides a display panel 100. The display panel 100 includes a first mode and a second mode. A viewing angle of the display panel 100 in the first mode is smaller than a viewing angle of the display panel 100 in the second mode. The display panel 100 includes a viewing angle adjustment liquid crystal cell 10, a dimming liquid crystal cell 20, and a panel body 30.

The viewing angle adjustment liquid crystal cell 10 is configured to adjust a display viewing angle of the display panel 100. The viewing angle adjustment liquid crystal cell 10 includes a first liquid crystal layer 11. The first liquid crystal layer 11 includes a polymer network 111 and first liquid crystal molecules 112 distributed in the polymer network 111.

The dimming liquid crystal cell 20 and the viewing angle adjustment liquid crystal cell 10 are overlapped. The light adjustment liquid crystal cell 20 includes a second liquid crystal layer 21. The second liquid crystal layer 21 includes a polymer 211 and second liquid crystal molecules 212 distributed in the polymer 211. In the second mode, the dimming liquid crystal cell 20 is configured to scatter incident light.

The panel body 30 is arranged on a light-emitting side of the viewing angle adjustment liquid crystal cell 10 and the dimming liquid crystal cell 20.

It should be noted that, in the embodiment of the present application, the first mode of the display panel 100 can be defined as a peep-proof display mode, i.e., a narrow viewing angle mode, for example. The second mode of the display panel 100 can be defined as a normal display mode, i.e., a wide viewing angle mode, for example.

Based on the display panel 100 of the embodiment of the present application in the second mode, the dimming liquid crystal cell 20 is used to scatter incident light to increase side-view brightness under wide viewing angles, thereby improving the display effect of the wide viewing angle.

In an embodiment, the dimming liquid crystal cell 20 can be provided on a light-emitting side or a light entrance side of the viewing angle adjustment liquid crystal cell 10, wherein the dimming liquid crystal cell 20 is provided on the light-emitting side of the viewing angle adjustment liquid crystal cell 10 as an example, but not limited to the examples described and shown.

During an implement process of the present application, when the display panel 100 is in the second mode, the first liquid crystal layer 11 in the viewing angle adjustment liquid crystal cell 10 is in a wide viewing angle mode, wherein light passing through the viewing angle adjustment liquid crystal cell 10 will be scattered such that a propagation angle of light is enlarged. The scattered light is scattered again by continuous refraction when the scattered light passes through the dimming liquid crystal cell 20 due to a refractive index difference between the polymer 211 and the second liquid crystal molecule 212. The brightness at the side viewing angle is thus further increased, as well as the wide viewing angle display effect of the display panel 100 is further improved.

Figure 3:
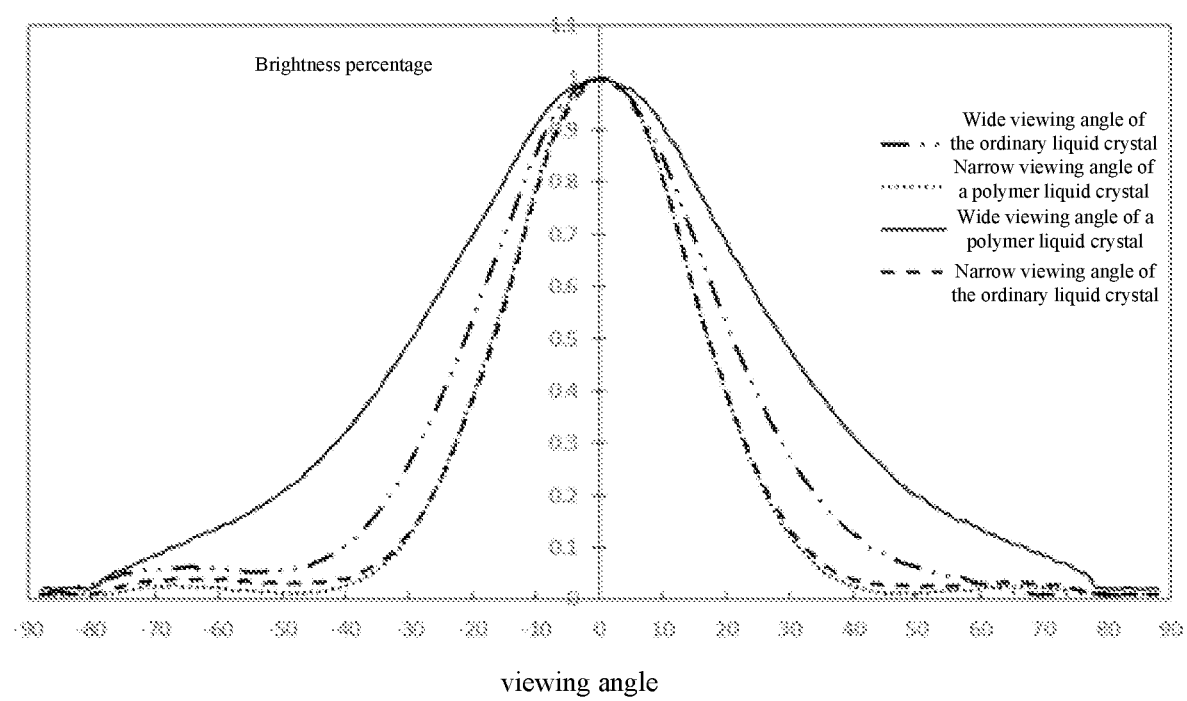
FIG. 3 is a schematic diagram showing percentage of brightness of different liquid crystals at different viewing angles.

Please refer to FIG. 3, which shows curves of the brightness ratio of a wide viewing angle of an ordinary liquid crystal (second mode), a narrow viewing angle of the ordinary liquid crystal (first mode), a wide viewing angle of a polymer liquid crystal (second mode), and a wide viewing angle of the polymer liquid crystal (first mode).

It should be noted, the brightness percentage is defined as a brightness ratio of the brightness at each viewing angle to the brightness at 0 degree viewing angle, where the first liquid crystal layer 11 and the second liquid crystal layer 21 are both polymer liquid crystal layers.

According to FIG. 3, a brightness percentage of polymer liquid crystal in the second mode is greater than that of ordinary liquid crystal in the second mode, and a brightness percentage of polymer liquid crystal in the first mode is substantially the same as that of ordinary liquid crystal in the first mode.

In an embodiment, in the brightness curve of the second liquid crystal layer 21 in the second mode, the brightness percentage corresponding to a 45-degree viewing angle is greater than 15%.

In an embodiment, in the brightness curve of the second liquid crystal layer 21 in the second mode, the brightness percentage corresponding to the 45-degree viewing angle can also be less than or equal to 60%.

For example, in the brightness curve of the second liquid crystal layer 21 in the second mode, the brightness percentage corresponding to the 45-degree viewing angle can be 18.66%, 25.77%, 40.56%, 48%, or 56.2%.

The present application is illustrated by taking FIG. 3 as an example, but not limited to the examples described and shown.

In the second mode, the brightness percentage corresponding to a 45-degree viewing angle is 25.77% in the brightness curve of the second liquid crystal layer 21. The brightness percentage corresponding to the 45-degree viewing angle is 6.99% in the brightness curve of ordinary liquid crystal.

In the first mode, the brightness percentage corresponding to the 45-degree viewing angle is 3.3% in the brightness curve of ordinary liquid crystal. The brightness percentage corresponding to the 45-degree viewing angle is 1.67% in the brightness curve of the second liquid crystal layer 21.

In an embodiment, the display panel 100 further includes a first polarizer p1 and a second polarizer p2. The optical axis direction of the first polarizer p1 is parallel to the optical axis direction of the second polarizer p2. The first polarizer p1 is set on the viewing angle adjustment liquid crystal cell 10. The second polarizer p2 is arranged on the side of the viewing angle adjustment liquid crystal cell 10 away from the first polarizer p1.

The second liquid crystal molecules 212 have a first refractive index and a second refractive index. The first refractive index is the refractive index of the second liquid crystal molecules 212 in the long axis direction. The second refractive index is the refractive index of the second liquid crystal molecules 212 in the short axis direction. The first refractive index is greater than the second refractive index. The refractive index of the polymer 211 is equal to the second refractive index.

In the second mode, the long axis direction of the second liquid crystal molecule 212 is crossed with the normal direction z of the first polarizer p1.

In an embodiment, the first polarizer p1 is located on the light incident side of the viewing angle adjustment liquid crystal cell 10, the second polarizer p2 is located on the light-emitting side of the viewing angle adjustment liquid crystal cell 10.

The polarization direction of the polarized light is horizontal. In the second mode, the dimming liquid crystal cell 20 is in a scattering mode, wherein the polarized light can propagate along the long axis direction of the second liquid crystal molecule 212 since the refractive index of polymer 211 is less than the first refractive index, which causes the light to be scattered and comes out scattering effect.

In an embodiment, in the second mode, the long axis direction of the second liquid crystal molecule 212 is perpendicular to the normal direction z of the first polarizer p1. That is, the second liquid crystal molecules 212 are in a horizontal state.

In an embodiment, in the first mode, the long axis direction of the second liquid crystal molecule 212 is arranged parallel to the normal direction z of the first polarizer p1. That is, the second liquid crystal molecules 212 are in a vertical state. In the first mode, the dimming liquid crystal cell 20 is in a transmission mode, wherein the polarized light can propagate along the short axis direction of the second liquid crystal molecules 212 since the refractive index of polymer 211 is equal to the second refractive index.

In an embodiment, a difference between the first refractive index and the second refractive index is greater than or equal to 0.07 and the difference is less than or equal to 0.5. For example, the difference can be a value selected from 0.07, 0.1, 0.15, 0.2, 0.35 and 0.5.

In an embodiment, in the dimming liquid crystal cell 20, the polymer 211 is a polymer network, and the second liquid crystal molecule 212 is a negative liquid crystal. The polymer 211 is arranged along the first direction. The first direction is parallel to the normal direction z of the first polarizer p1.

In an embodiment, the polymer 211 is a polymer network that can provide an orientation effect to the second liquid crystal molecules 212, such that the long axis of the second liquid crystal molecule 212 is also parallel to the normal direction z of the first polarizer p1.

In an embodiment, dimming liquid crystal cell 20 further includes a first electrode layer 22 and a second electrode layer 23. The first electrode layer 22 is arranged on the side of the second liquid crystal layer 21 close to the panel body 30. The second electrode layer 23 is disposed on the side of the second liquid crystal layer 21 away from the first electrode layer 22.

In the embodiment of the present application, the first electrode layer 22 and the second electrode layer 23 are used to apply voltage to control the long axis of the second liquid crystal molecule 212 for switching the transmission mode and the scattering mode. Specifically, when a voltage difference between the first electrode layer 22 and the second electrode layer 23 is less than a threshold, the long axis of the second liquid crystal molecule 212 is arranged along the direction z parallel to the normal line of the first polarizer p1. When the voltage difference between the first electrode layer 22 and the second electrode layer 23 is greater than the threshold, the long axis of the second liquid crystal molecule 212 is arranged in a direction perpendicular to the normal direction z. Noted that the threshold can be selected according to actual needs, and there is no limit here.

In other words, when no voltage is applied to the first electrode layer 22 and the second electrode layer 23, and the second liquid crystal molecules 212 are arranged along the direction z parallel to the normal line of the first polarizer p1, such that the dimming liquid crystal cell 20 is in a transmission mode. When the threshold voltage is applied to the first electrode layer 22 and the second electrode layer 23, and the second liquid crystal molecules 212 are arranged along the direction perpendicular to the normal direction z of the first polarizer p1, such that the dimming liquid crystal cell 20 is in a scattering mode.

In an embodiment, the viewing angle adjustment liquid crystal cell 10 further includes a third electrode layer 12 and a fourth electrode layer 13. The third electrode layer 12 is arranged between the first polarizer p1 and the first liquid crystal layer 11. The fourth electrode layer 13 is arranged between the second polarizer p2 and the first liquid crystal layer 11.

The polymer network 111 is arranged along the second direction m. The second direction m is inclined with respect to the normal direction z of the first polarizer p1.

In the first mode, the long axis of the first liquid crystal molecule 112 is arranged along the second direction m.

In the second mode, the long axis of the first liquid crystal molecule 112 is arranged along the third direction n, and the second direction m is different from the third direction n.

It should be noted that, in a spatial coordinate system, the second direction m is inclined relative to the normal direction z (z coordinate axis), also tilted relative to the x coordinate axis. In an embodiment, the third direction n can be parallel to the x coordinate axis.

The polymer network 111 can provide an orientation effect to the first liquid crystal molecules 112. In an embodiment, the viewing angle adjustment liquid crystal cell 10 works in the first mode, such that light incident along the normal direction z of the first polarizer p1 pass through the second polarizer p2, and the light incident along the normal direction z inclined to the first polarizer p1 is blocked or partially blocked by the second polarizer p2. In the second mode, the long axis of the first liquid crystal molecule 112 is different from the third direction so that more light can pass through the second polarizer p2, and the viewing angle range of the display panel 100 is increased in the second mode and is greater than the viewing angle of the display panel 100 in the first mode.

In addition, a third electrode layer 12 and a fourth electrode layer 13 are used to apply voltage to control the long axis of the first liquid crystal molecules 112 for switching the first mode and the second mode. Specifically, when the voltage difference between the third electrode layer 12 and the fourth electrode layer 13 is less than the threshold, the long axis of the first liquid crystal molecules 112 are arranged along the second direction m. When the voltage difference between the third electrode layer 12 and the fourth electrode layer 13 is greater than the threshold, the long axis of the first liquid crystal molecules 112 are arranged along the third direction n, wherein the threshold can be selected according to actual needs and is not limited here. In other words, when no voltage is applied to the third electrode layer 12 and the fourth electrode layer 13, the display panel 100 is in the first mode. When a predetermined voltage is applied to the third electrode layer 12 and the fourth electrode layer 13, the display panel 100 is in the second mode.

In an embodiment, the display panel 100 further includes a third polarizer p3. The third polarizer p3 is set on the light-emitting side of the panel body 30. The optical axis direction of the third polarizer p3 is perpendicular to the optical axis direction of the first polarizer p1.

In the display panel 100 of the embodiment, the display panel 100 further includes a fourth polarizer p4, wherein the fourth polarizer p4 is arranged on the side of the panel body 30 close to the first polarizer p1. The optical axis direction of the fourth polarizer p4 is parallel to the optical axis direction of the first polarizer p1.

In some embodiments, when the viewing angle adjustment liquid crystal cell 10 is located between the dimming liquid crystal cell 20 and the panel body 30, the viewing angle adjustment liquid crystal cell 10 and the panel body 30 can pass through the second polarizer p2.

Figure 4:
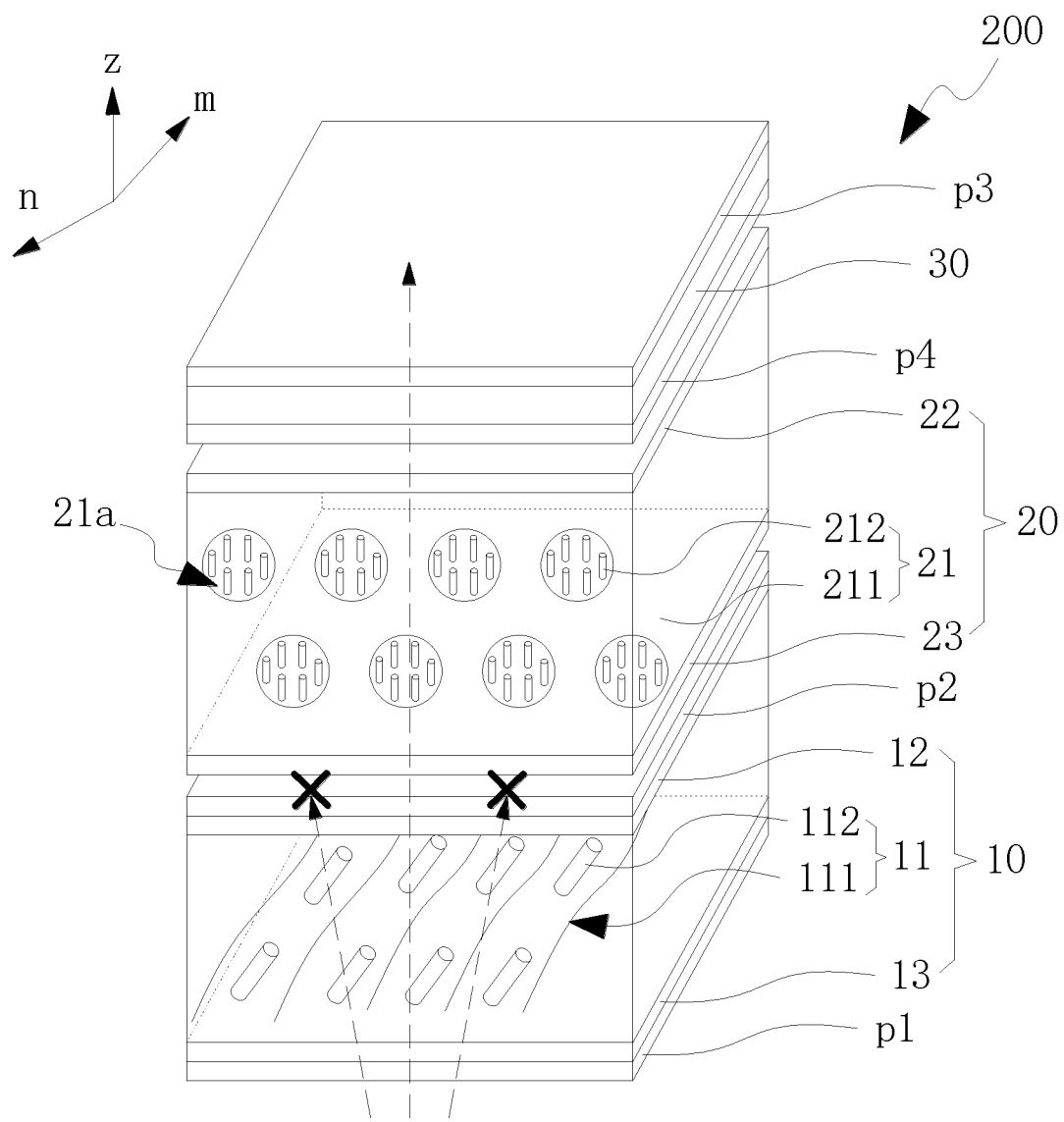
FIG. 4 is a schematic diagram of a second structure of a display panel in the first mode provided by an embodiment of the present application.
Figure 5:
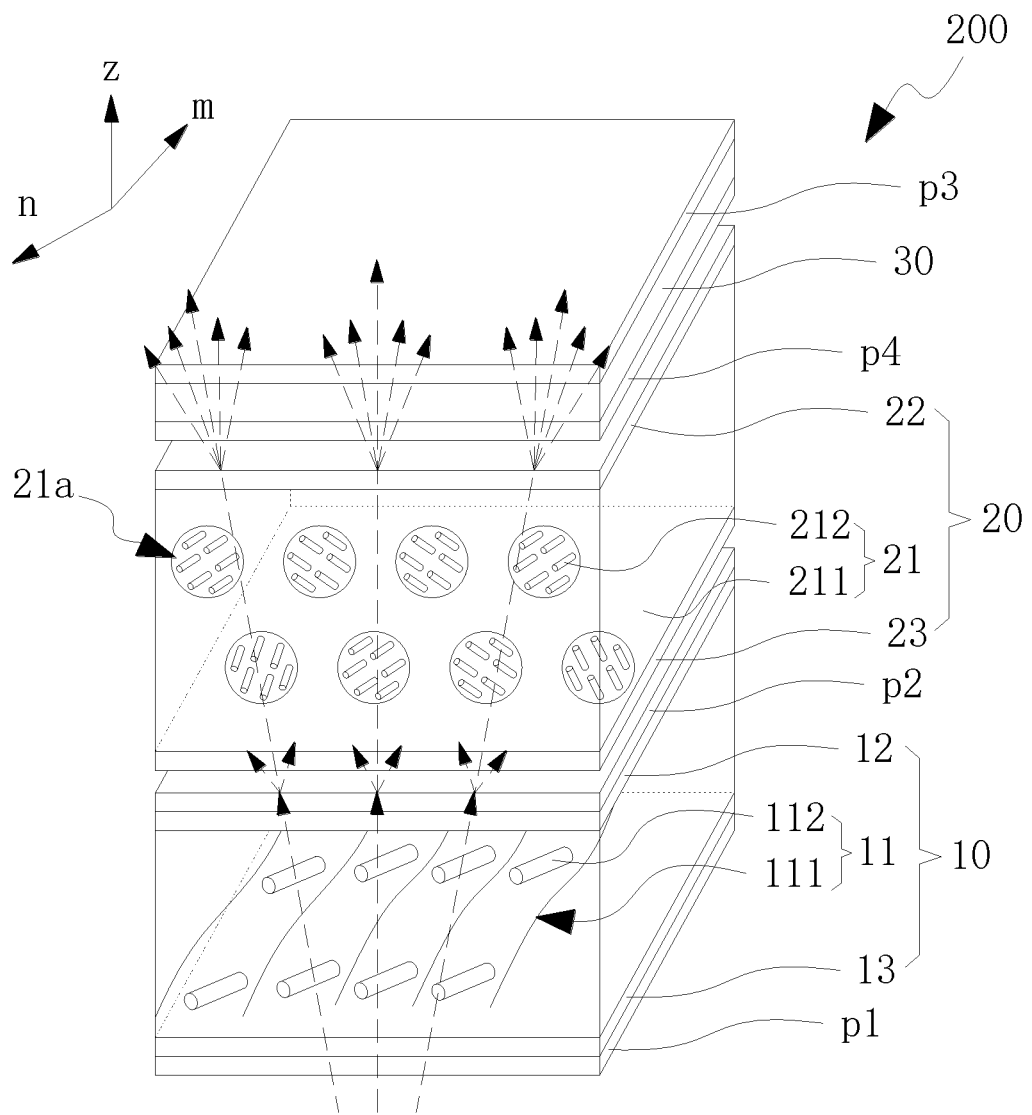
FIG. 5 is a schematic diagram of a second structure of a display panel in the second mode provided by an embodiment of the present application.

Please refer to FIG. 4 and FIG. 5, the display panel 200 of the embodiment includes a first mode and a second mode. The viewing angle of the display panel 200 in the first mode is smaller than the viewing angle of the display panel 200 in the second mode. The display panel 200 includes a viewing angle adjustment liquid crystal cell 10, a dimming liquid crystal cell 20, and a panel body 30.

The viewing angle adjustment liquid crystal cell 10 is used to adjust the display viewing angle of the display panel 200. The viewing angle adjustment liquid crystal cell 10 includes a first liquid crystal layer 11. The first liquid crystal layer 11 includes a polymer network 111 and first liquid crystal molecules 112 distributed in the polymer network 111.

The dimming liquid crystal cell 20 and the viewing angle adjustment liquid crystal cell 10 are overlapped. The light adjustment liquid crystal cell 20 includes a second liquid crystal layer 21. The second liquid crystal layer 21 includes a polymer 211 and second liquid crystal molecules 212 distributed in the polymer 211. In the second mode, the dimming liquid crystal cell 20 is used to scatter the incident light.

The panel body 30 is arranged on the light-emitting side of the viewing angle adjustment liquid crystal cell 10 and the dimming liquid crystal cell 20.

The difference between the display panel 200 of the embodiment and the display panel 100 of the above-mentioned embodiment is as follows. In the dimming liquid crystal cell 20, a porous structure 21a is formed inside the polymer 211. The second liquid crystal molecules 212 are dispersed in the porous structure 21a, and the second liquid crystal molecules 212 are positive liquid crystals.

The first electrode layer 22 and the second electrode layer 23 are used for applying voltage to control the long axis of the second liquid crystal molecule 212 for switching the transmission mode and the scattering mode. Specifically, when the voltage difference between the first electrode layer 22 and the second electrode layer 23 is less than the threshold, the long axis of the second liquid crystal molecule 212 is arranged in a direction inclined to the normal direction z. When the voltage difference between the first electrode layer 22 and the second electrode layer 23 is greater than the threshold, the long axis of the second liquid crystal molecule 212 is arranged along the direction z parallel to the normal line of the first polarizer p1, wherein the threshold can be selected according to actual needs, and is not limited here.

In other words, when no voltage is applied to the first electrode layer 22 and the second electrode layer 23, the second liquid crystal molecules 212 are arranged along a direction inclined to the normal direction z of the first polarizer p1, so that the dimming liquid crystal cell 20 is in the scattering mode. When the threshold voltage is applied to the first electrode layer 22 and the second electrode layer 23, the second liquid crystal molecules 212 are arranged along the direction z parallel to the normal line of the first polarizer p1, so that the dimming liquid crystal cell 20 is in transmission mode.

Figure 6:
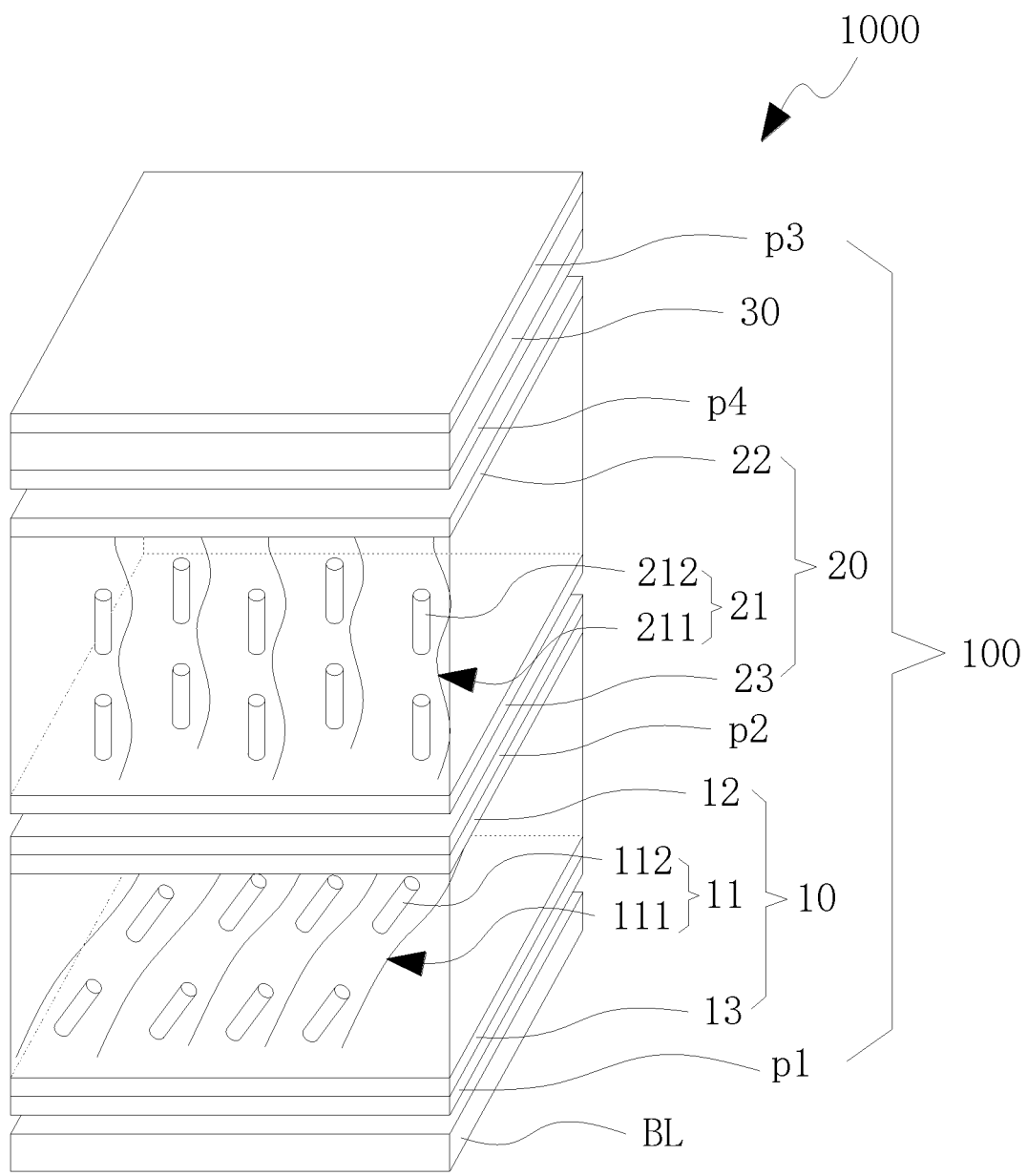
FIG. 6 is a schematic structural diagram of a display device provided by an embodiment of the present application.

Please refer to FIG. 6. Accordingly, an embodiment of the present application further provides a display device 1000, which includes a backlight module BL and a display panel as in the above embodiment arranged on the backlight module BL.

Optionally, the backlight module BL can be a straight down backlight or a side incident backlight.

It should be noted that FIG. 6 takes the display panel 100 as an example, but is not limited to this. For the specific description of the display panel, please refer to the display panel 100/200 of the above embodiment, which will not be repeated here.

The display panel of the present application embodiment includes a first mode and a second mode, and the viewing angle of the display panel in the first mode is smaller than that of the display panel in the second mode perspective. Viewing angle adjustment liquid crystal cell is used to adjust the display viewing angle of the display panel. In the second mode, the display panel uses the dimming liquid crystal cell to scatter the incoming light, which improves the side view brightness under wide viewing angle, and improves the display effect of wide viewing angle.

The above describes in detail a display panel and display device provided by the embodiment the present application of the present application embodiment of embodiment of the present application the present application, there will be changes in the specific implementation mode and application scope. In conclusion, the contents of this specification should not be understood as restrictions on the present application.

What is claimed is:

1. A display panel comprising a first mode and a second mode, wherein a viewing angle of the display panel in the first mode is smaller than a viewing angle of the display panel in the second mode, the display panel comprising:
   a viewing angle adjustment liquid crystal cell, wherein the viewing angle adjustment liquid crystal cell is configured to adjust a display viewing angle of the display panel, the viewing angle adjustment liquid crystal cell comprises a first liquid crystal layer, and the first liquid crystal layer comprises a polymer network and first liquid crystal molecules distributed in the polymer network;
   a dimming liquid crystal cell, wherein the dimming liquid crystal cell and the viewing angle adjustment liquid crystal cell are overlapped, the dimming liquid crystal cell comprises a second liquid crystal layer, the second liquid crystal layer comprises a polymer and second liquid crystal molecules distributed in the polymer, and the dimming liquid crystal cell is configured to scatter incident light in the second mode; and
   a panel body disposed on a light-emitting side of the viewing angle adjustment liquid crystal cell and the dimming liquid crystal cell,
   wherein the display panel further comprises a first polarizer and a second polarizer, an optical axis direction of the first polarizer is parallel to an optical axis direction of the second polarizer, the first polarizer is arranged on the viewing angle adjustment liquid crystal cell, and the second polarizer is arranged on a side of the viewing angle adjustment liquid crystal cell away from the first polarizer;
   wherein the second liquid crystal molecules comprise a first refractive index and a second refractive index, the first refractive index is a refractive index of the second liquid crystal molecules in a long axis direction, the second refractive index is a refractive index of the second liquid crystal molecules in a short axis direction, the first refractive index is greater than the second refractive index, and a refractive index of the polymer is equal to the second refractive index; and
   wherein in the second mode, the long axis direction of the second liquid crystal molecules crosses a normal direction of the first polarizer.

2. The display panel according to claim 1, wherein the long axis direction of the second liquid crystal molecules is parallel to the normal direction of the first polarizer in the first mode.

3. The display panel according to claim 1, wherein the long axis direction of the second liquid crystal molecules is perpendicular to the normal direction of the first polarizer in the second mode.

4. The display panel according to claim 1, wherein a difference between the first refractive index and the second refractive index is greater than or equal to 0.07, and the difference is less than or equal to 0.5.

5. The display panel according to claim 1, wherein in the dimming liquid crystal cell, the polymer is a polymer network, the second liquid crystal molecules are negative liquid crystals, the polymer is arranged along a first direction, and the first direction is parallel to the normal direction of the first polarizer.

6. The display panel according to claim 2, wherein in the dimming liquid crystal cell, a porous structure is arranged inside the polymer, the second liquid crystal molecules are dispersed in the porous structure, and the second liquid crystal molecules are positive liquid crystals.

7. The display panel according to claim 1, wherein the dimming liquid crystal cell further comprises a first electrode layer and a second electrode layer, the first electrode layer is arranged on a side of the second liquid crystal layer close to the panel body, and the second electrode layer is arranged on a side of the second liquid crystal layer away from the first electrode layer.

8. The display panel according to claim 1, wherein the viewing angle adjustment liquid crystal cell further comprises a third electrode layer and a fourth electrode layer, the third electrode layer is arranged between the first polarizer and the first liquid crystal layer, and the fourth electrode layer is arranged between the second polarizer and the first liquid crystal layer;
   wherein the polymer network is arranged along a second direction, and the second direction is inclined with respect to the normal direction of the first polarizer;
   wherein a long axis of the first liquid crystal molecules is arranged along the second direction in the first mode; and
   wherein in the second mode, the long axis of the first liquid crystal molecules is arranged along a third direction different from the second direction.

9. The display panel according to claim 1, wherein the display panel further comprises a third polarizer, the third polarizer is arranged on a light-emitting side of the panel body, and an optical axis direction of the third polarizer is perpendicular to the optical axis direction of the first polarizer.

10. The display panel according to claim 1, wherein in a brightness curve of the second liquid crystal layer in the second mode, brightness percentage corresponding to a viewing angle of 45 degrees is greater than 15%.

11. A display device comprising a backlight module and a display panel arranged on the backlight module, wherein the display panel comprises a first mode and a second mode, and a viewing angle of the display panel in the first mode is smaller than a viewing angle of the display panel in the second mode, the display panel comprising:
   a viewing angle adjustment liquid crystal cell, wherein the viewing angle adjustment liquid crystal cell is configured to adjust a display viewing angle of the display panel, the viewing angle adjustment liquid crystal cell comprises a first liquid crystal layer, and the first liquid crystal layer comprises a polymer network and first liquid crystal molecules distributed in the polymer network;
   a dimming liquid crystal cell, wherein the dimming liquid crystal cell and the viewing angle adjustment liquid crystal cell are overlapped, the dimming liquid crystal cell comprises a second liquid crystal layer, the second liquid crystal layer comprises a polymer and second liquid crystal molecules distributed in the polymer, and the dimming liquid crystal cell is configured to scatter incident light in the second mode; and
   a panel body disposed on a light-emitting side of the viewing angle adjustment liquid crystal cell and the dimming liquid crystal cell,
   wherein the display panel further comprises a first polarizer and a second polarizer, an optical axis direction of the first polarizer is parallel to an optical axis direction of the second polarizer, the first polarizer is arranged on the viewing angle adjustment liquid crystal cell, and the second polarizer is arranged on a side of the viewing angle adjustment liquid crystal cell away from the first polarizer;

wherein the second liquid crystal molecules comprise a first refractive index and a second refractive index, the first refractive index is a refractive index of the second liquid crystal molecules in a long axis direction, the second refractive index is a refractive index of the second liquid crystal molecules in a short axis direction, the first refractive index is greater than the second refractive index, and a refractive index of the polymer is equal to the second refractive index; and wherein in the second mode, the long axis direction of the second liquid crystal molecules crosses a normal direction of the first polarizer.

12. The display device according to claim 11, wherein the long axis direction of the second liquid crystal molecules is parallel to the normal direction of the first polarizer in the first mode.

13. The display device according to claim 11, the long axis direction of the second liquid crystal molecules is perpendicular to the normal direction of the first polarizer in the second mode.

14. The display device according to claim 11, wherein a difference between the first refractive index and the second refractive index is greater than or equal to 0.07, and the difference is less than or equal to 0.5.

15. The display device according to claim 11, wherein in the dimming liquid crystal cell, the polymer is a polymer network, the second liquid crystal molecules are negative liquid crystals, the polymer is arranged along a first direction, and the first direction is parallel to the normal direction of the first polarizer.

16. The display device according to claim 11, wherein in the dimming liquid crystal cell, a porous structure is arranged inside the polymer, the second liquid crystal molecules are dispersed in the porous structure, and the second liquid crystal molecules are positive liquid crystals.

17. The display device according to claim 11, wherein the dimming liquid crystal cell further comprises a first electrode layer and a second electrode layer, the first electrode layer is arranged on a side of the second liquid crystal layer close to the panel body, and the second electrode layer is arranged on a side of the second liquid crystal layer away from the first electrode layer.

18. The display device according to claim 11, wherein the viewing angle adjustment liquid crystal cell further comprises a third electrode layer and a fourth electrode layer, the third electrode layer is arranged between the first polarizer and the first liquid crystal layer, and the fourth electrode layer is arranged between the second polarizer and the first liquid crystal layer;

wherein the polymer network is arranged along a second direction, and the second direction is inclined with respect to the normal direction of the first polarizer;

wherein in the first mode, a long axis of the first liquid crystal molecules is arranged along the second direction; and wherein in the second mode, the long axis of the first liquid crystal molecules is arranged along a third direction different from the second direction.

* * * * *